Figure 1:
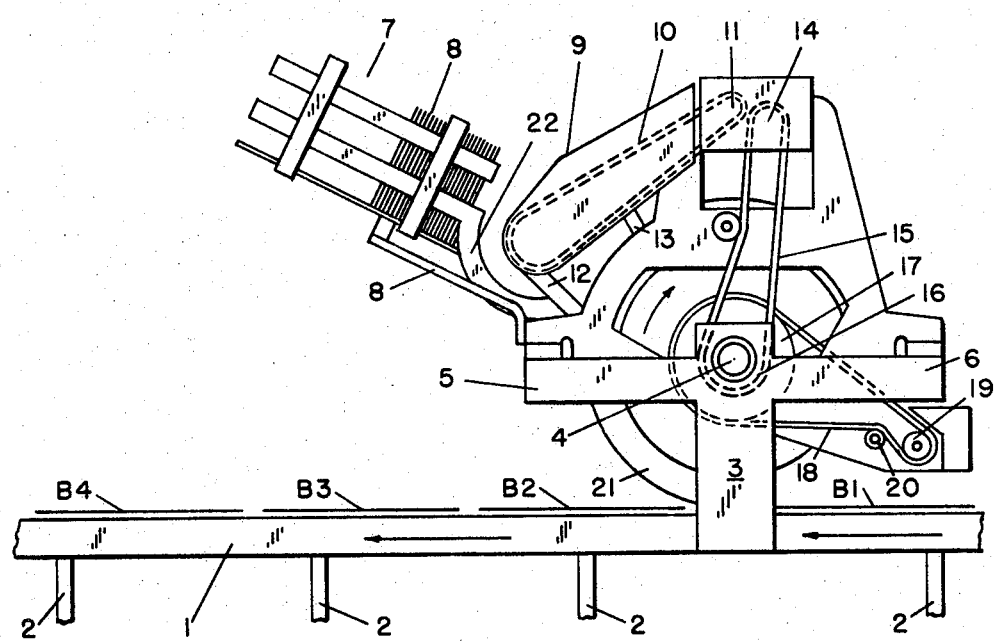

May 7, 1968     H. G. GENTRY     3,381,593
MACHINE AND METHOD FOR SECURING AN AUXILIARY
BLANK TO A MAIN CARRIER BLANK
Filed March 7, 1966     7 Sheets-Sheet 1

INVENTOR.
HERMOND G. GENTRY
BY Walter M. Rodgers
ATTORNEY

INVENTOR.
HERMOND G. GENTRY
BY Walter M. Rodgers
ATTORNEY

May 7, 1968

H. G. GENTRY 3,381,593

MACHINE AND METHOD FOR SECURING AN AUXILIARY
BLANK TO A MAIN CARRIER BLANK

Filed March 7, 1966

7 Sheets-Sheet 3

INVENTOR.
HERMOND G. GENTRY
BY
*Walter M. Rodgers*
ATTORNEY

May 7, 1968  H. G. GENTRY  3,381,593
MACHINE AND METHOD FOR SECURING AN AUXILIARY
BLANK TO A MAIN CARRIER BLANK
Filed March 7, 1966  7 Sheets-Sheet 4

INVENTOR.
HERMOND G. GENTRY
BY
Walter M. Rodgers
ATTORNEY

*INVENTOR.*
HERMOND G. GENTRY
BY
*Walter M. Rodgers*
ATTORNEY

INVENTOR.
HERMOND G. GENTRY
BY
Walter M. Rodgers
ATTORNEY

INVENTOR.
HERMOND G. GENTRY
BY *Walter M. Rodgers*
ATTORNEY

United States Patent Office 3,381,593
Patented May 7, 1968

3,381,593
MACHINE AND METHOD FOR SECURING AN AUXILIARY BLANK TO A MAIN CARRIER BLANK
Hermond G. Gentry, Atlanta, Ga., assignor to The Mead Corporation, a corporation of Ohio
Filed Mar. 7, 1966, Ser. No. 532,365
9 Claims. (Cl. 93—37)

This invention relates to a machine and method for securing an auxiliary blank to a main carrier blank and more particularly to an arrangement for imparting movement to an auxiliary blank along a path immediately above and generally coincident with a predetermined path of movement of the main blank whereby the auxiliary blank is folded and affixed to the main blank while moving in synchronism therewith.

United States Patent 3,203,324 issued Aug. 31, 1965 on an application filed by Hermond G. Gentry on Sept. 22, 1961 discloses an arrangement wherein an auxiliary blank of multi-panelled construction is affixed to a moving main carrier blank, the auxiliary blank being folded along fold lines which are disposed in a transverse direction relative to the predetermined path of movement of the main blank. According to the above mentioned patent, the auxiliary blanks are first moved along a path which is disposed in a transverse direction to the path of movement of the main blank and during such movement the auxiliary or insert blanks are folded by simple guides or plows. Upon completion of this folding operation, the direction, the direction of travel is changed by 90 degrees so that the path of movement of the auxiliary blanks then coincides with the path of movement of the main blank. The arrangement of Patent 3,203,324 is advantageous in that it eliminates the difficulties ordinarily associated with folding a portion of a blank along the trailing edge thereof. Difficulties, of course, are well known in connection with this type of folding operation due to the fact that movement of the blank is always away from the folding element and hence positive and sure folding is difficult.

A principal object of this invention is to provide an improved machine and method for affixing a multi-panelled auxiliary blank to a main blank wherein the entire path of movement of the auxiliary blank from its hopper to its point of application to the main blank is above and in coincidence with the path of movement of the main blank and where proper coordination of the movement of the two blanks is insured.

Another object of this invention is the provision of an improved machine which utilizes means for positively holding and securely gripping a multi-panelled auxiliary while folding it along a fold line which is transverse to the path of movement of both the auxiliary blank and of the main blank and wherein the folding operation is effected in connection with a part or panel on the trailing edge of the auxiliary blank.

The invention in one form comprises a rotatable drum element mounted directly above the path of movement of the main blank and disposed immediately adjacent to a hopper for supplying the auxiliary blank. In accordance with a feature of the invention, gripper means are provided on the drum which securely grip the leading edge of the auxiliary blank so as to hold it in fixed position relative to the drum as the drum rotates. Accordingly to another feature of the invention, folder means are movably mounted on the drum and arranged so as to impart folding movement to a part of the blank along the trailing edge thereof. Since the folder means are mounted on the drum and since the auxiliary blank is gripped and held securely in position relative to the drum, the usual difficulties encountered in folding the trailing edge of a blank while the blank is "going away" are eliminated according to this invention. Of course means are provided for applying adhesive material to a part of the auxiliary blank and for forcing such part of the auxiliary blank into firm contact with a part of the main blank.

Figure 2:
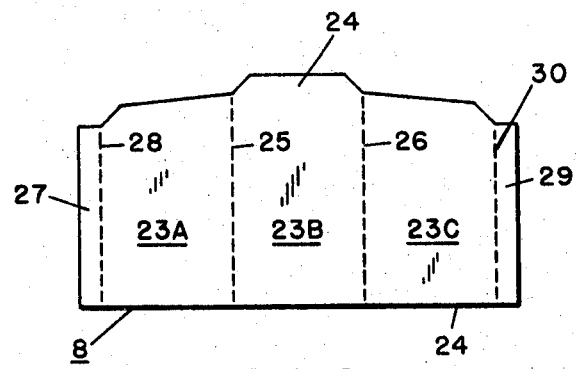
Figure 3:
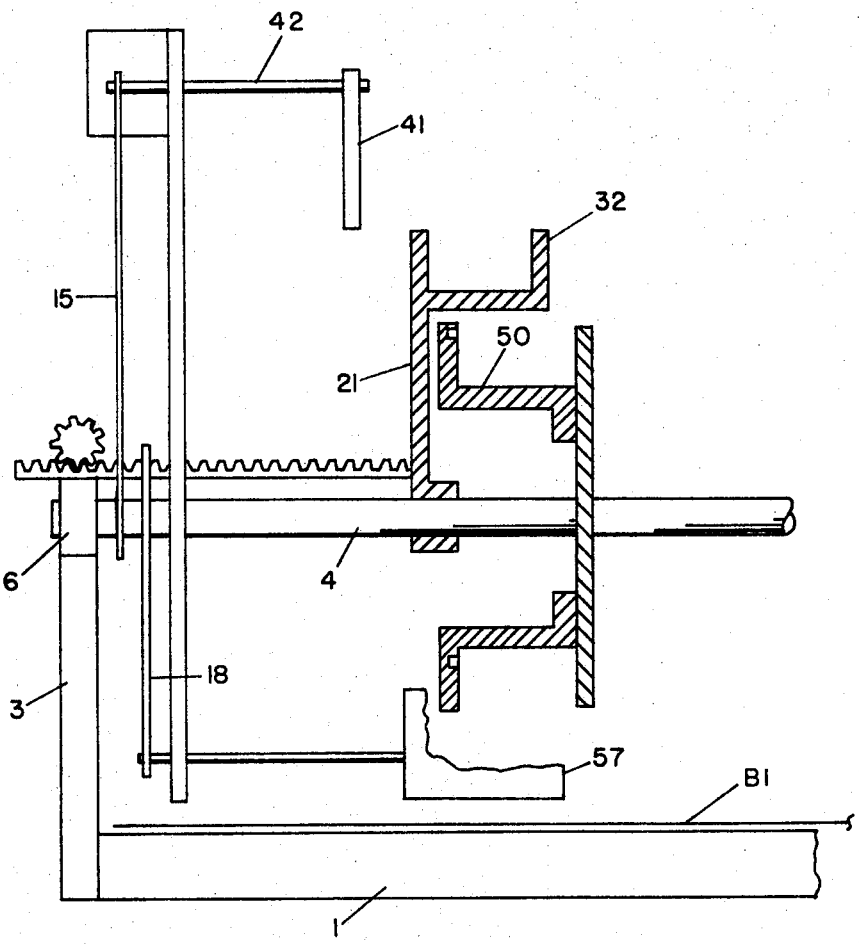
Figure 4:
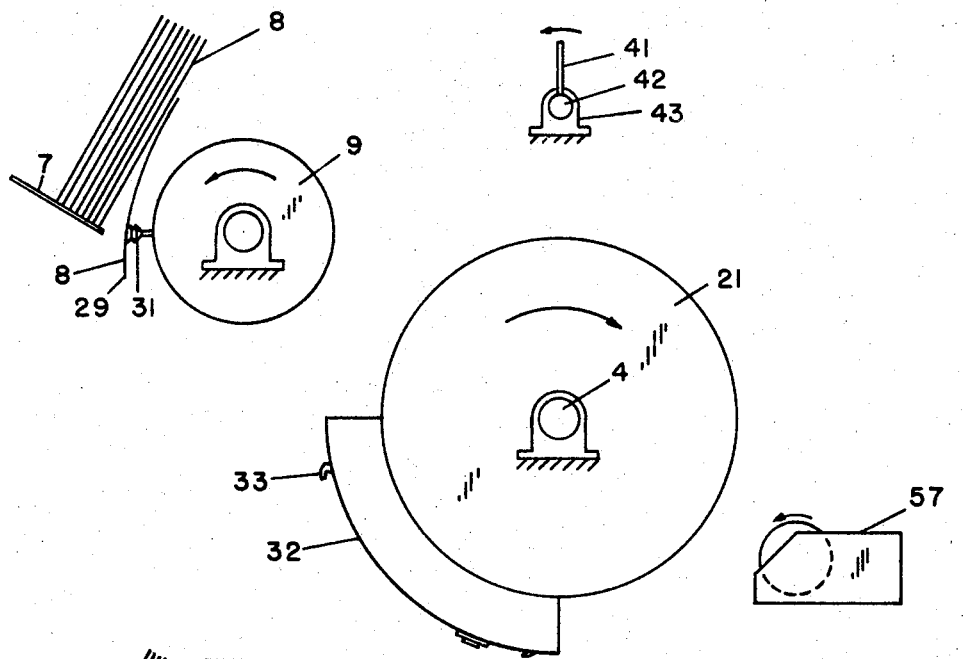
Figure 5:
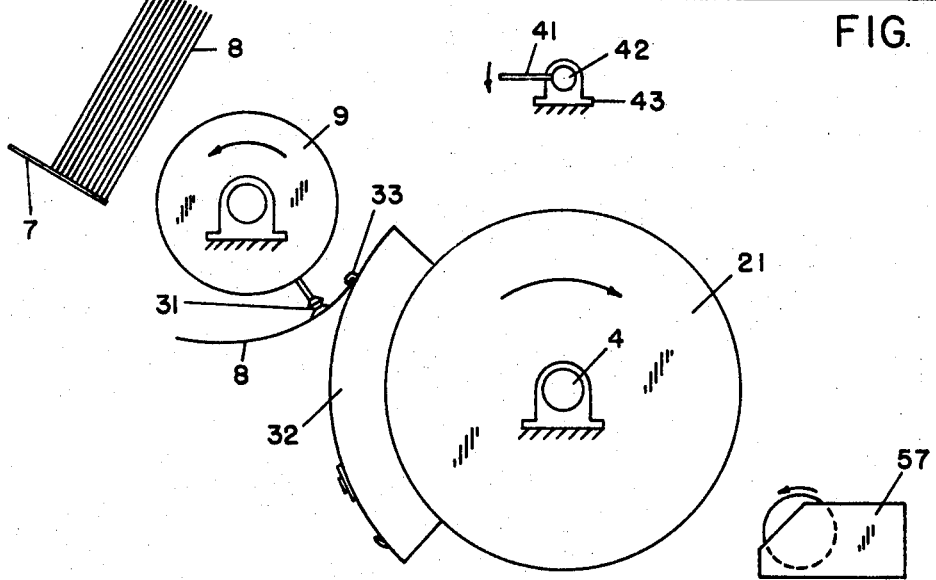
Figure 6:
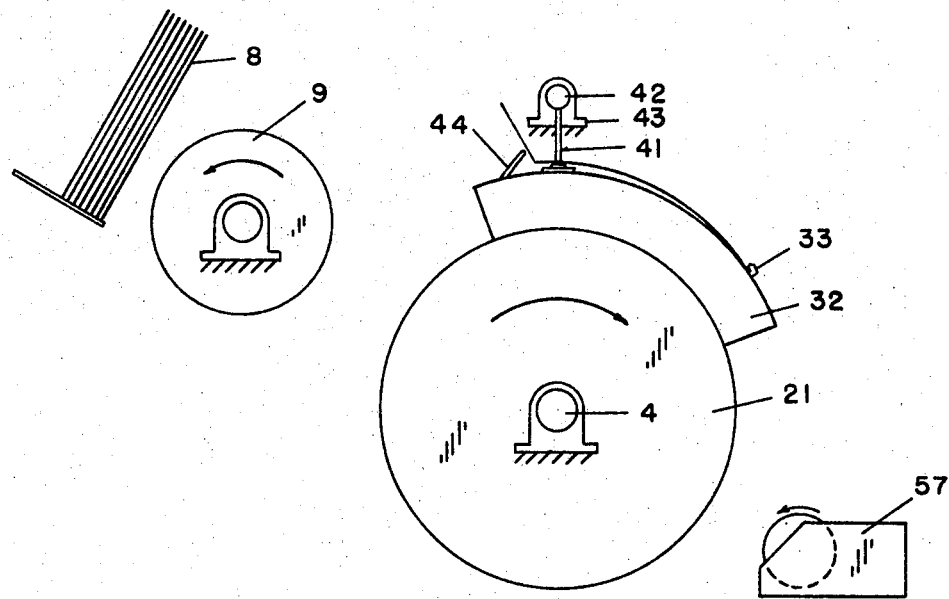
Figure 7:
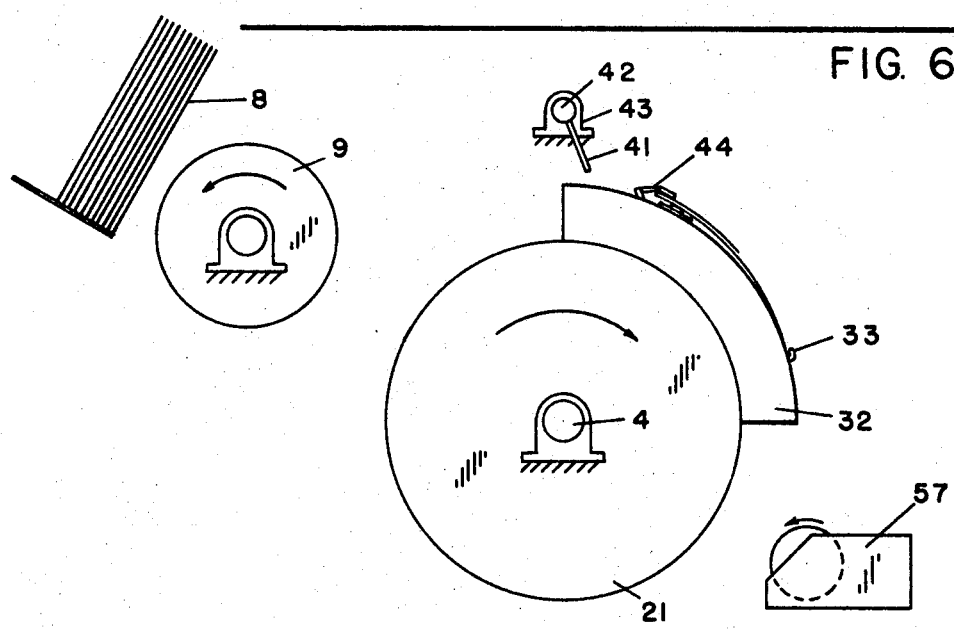
Figure 8:
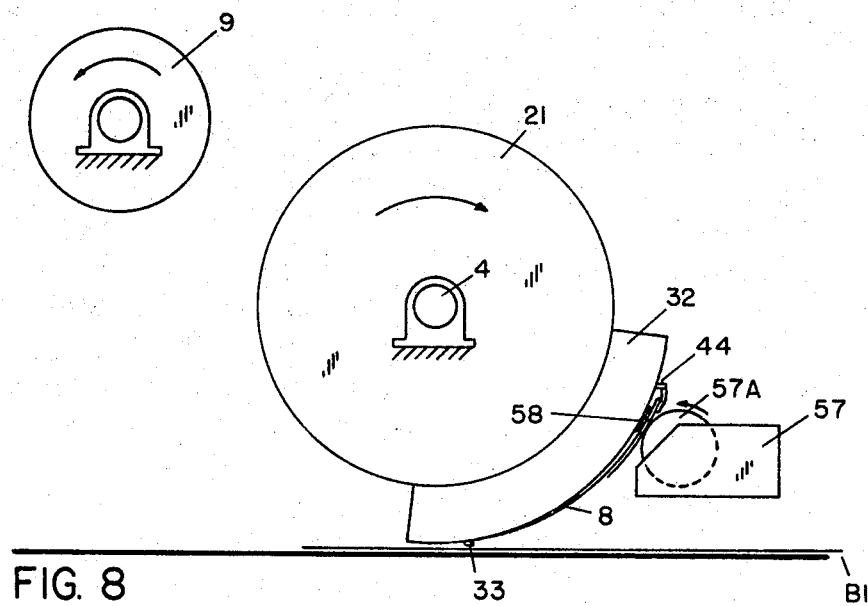
Figure 9:
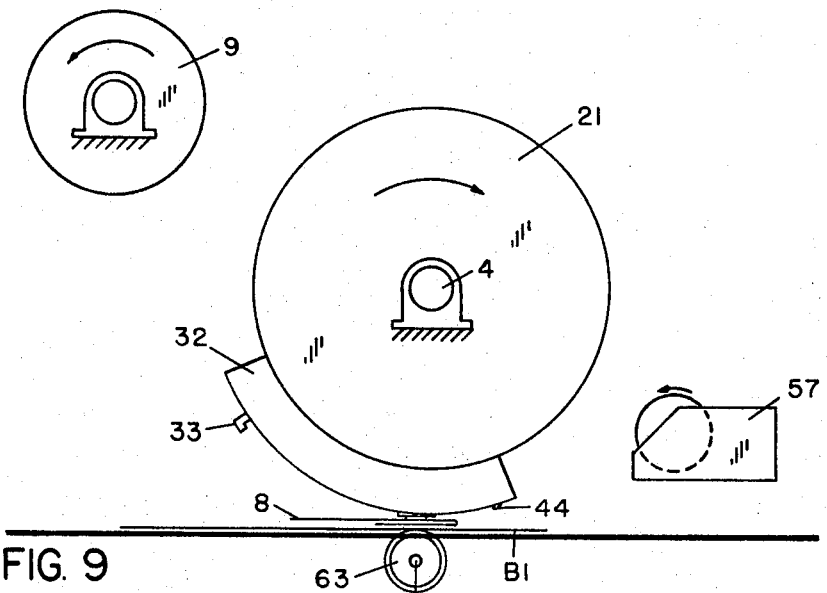
Figure 10:
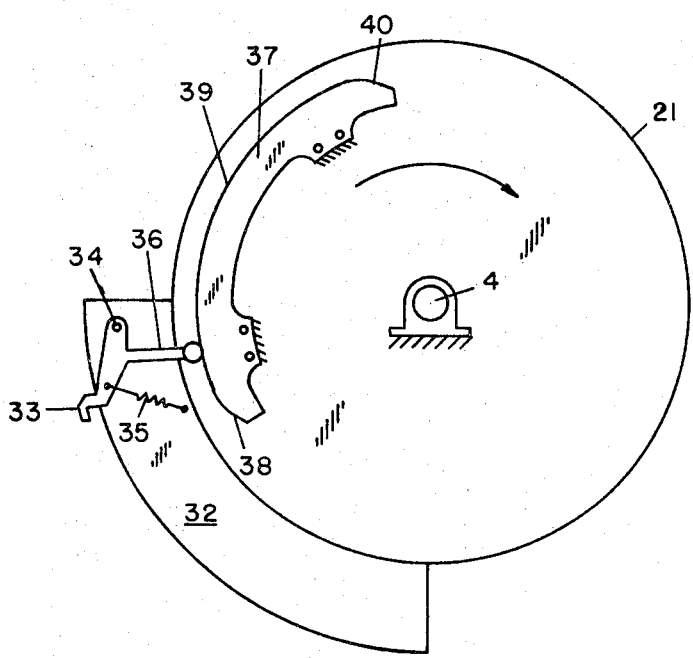
Figure 11:
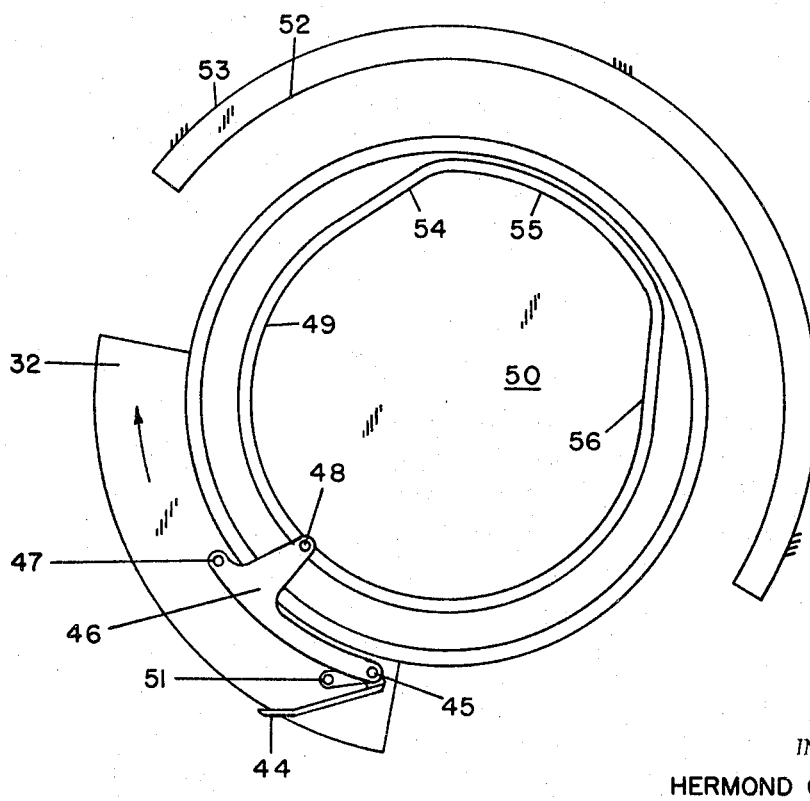
Figure 12:
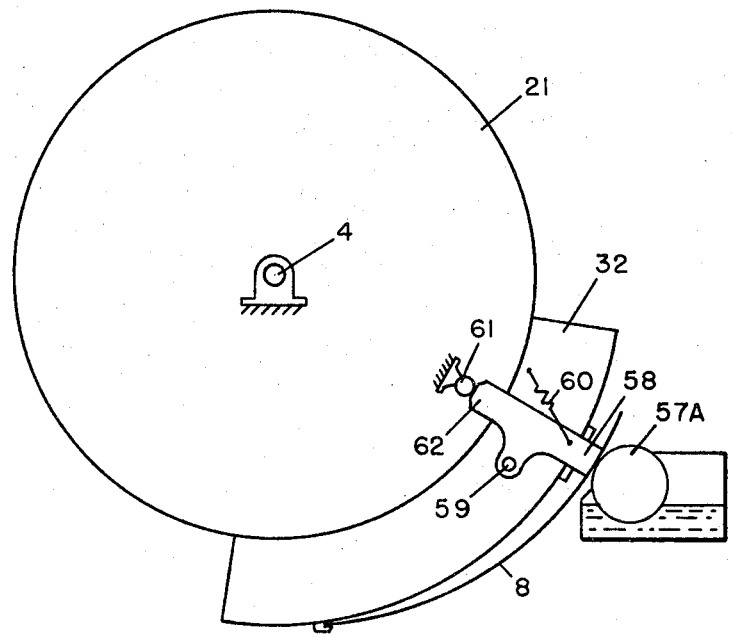

For a better understanding of the invention, reference may be had to the following detailed description taken in conjunction with the accompanying drawings in which FIG. 1 is a side view of a machine constructed according to the invention, FIG. 2 is a plan view of a multi-panelled auxiliary blank which is affixed to a main blank according to the invention; FIG. 3 is a front view of the machine depicted in FIG. 1; FIG. 4 is a schematic view generally similar to FIG. 1 and taken from the vantage point of FIG. 1 which shows the essential elements including hopper structure for storing the auxiliary blanks, feeder means for withdrawing a blank from the hopper, and a drum constructed according to this invention; FIG. 5 is a view similar to FIG. 4 and illustrating the gripping action of a gripper element constructed according to a feature of the invention; FIGS. 6 and 7 are schematic views similar to FIGS. 4 and 5 which illustrate the structure and function of folder means constructed according to this invention and by which a portion along the trailing edge of an auxiliary blank is folded upwardly and over into flat face contacting relation with an adjacent portion of the auxiliary blank; FIGS. 8 and 9 are similar to FIGS. 4–7, respectively, and schematically illustrate the application of glue in FIG. 8 to a part of the auxiliary blank and in FIG. 9 the step whereby a part of the auxiliary blank is affixed to the main blank; FIG. 10 is a schematic view similar to FIGS. 4–9 which depicts the cam and physical arrangement of the gripper elements schematically depicted in FIGS. 4 and 5; FIG. 11 is a view of the cam structure for operating the folder element schematically depicted in FIGS. 6 and 7; and in which FIG. 12 depicts the cam structure whereby an application of glue is made to an auxiliary blank following which the blank is forced into firm contacting relation with the main blank.

With reference to FIG. 1, the numeral 1 is used to designate a frame structure along which the main blanks B1, B2, B3 and B4 are moved. The frame 1 is supported by vertical pedestal supports designated by the numeral 2 and which in turn simply are mounted on a suitable base structure.

The machine constructed according to this invention is mounted on the frame 1 and comprises a yoke 3 secured at its lower end to frame 1. Yoke 3 comprises a pair of upright elements disposed at either end of the main shaft 4. Preferably each yoke 3 is provided with transversely disposed support arms 5 and 6 and a hopper structure generally designated by the numeral 7 is supported by frame element 8 secured to transversely disposed arm 5. Auxiliary blanks are mounted within the hopper 7 and are generally designated by the numeral 8.

For the purpose of withdrawing the lowermost auxiliary blank 8 from the hopper structure 7, a suitable feeder mechanism generally designated by the numeral 9 is employed. The feeder mechanism forms no part of the present invention and as will be readily understood, any known suitable feeder mechanism may be employed. The feeder mechanism is driven by a suitable driving chain or belt shown in dotted lines and designated by the numeral 10. The feeder 9 is supported by support arms 12 and 13 which are affixed to a part of the frame mounted on the transversely disposed arms 5.

Operating movement is imparted to feeder 9 and its associated sprocket 11b means of a sprocket 14 driven by a chain 15 which in turn is operated by a sprocket 16 securely affixed to shaft 4. Shaft 4 is rotated by a sprocket 17 securely affixed to shaft 4 and driven by a chain 18 which in turn is driven from a sprocket 19 driven by a part of a prime mover or by some other driving device. Preferably, a tightening sprocket 20 is yieldably mounted adjacent the chain 18 and serves to impart suitable tension thereto. Thus, motivating effort from sprocket 19 results in rotation of shaft 4 and in operation of feeder 9.

In order to interrelate the operation of feeder 9 and the main drum 21 mounted on shaft 4, a suitable guide 22 is mounted immediately adjacent the hopper 7 and between the hopper and drum 21. Thus, as a blank 8 is withdrawn from hopper 7 by feeder 9 the lower edge portion thereof is passed downwardly and then generally toward the right and upwardly due to the curved configuration of the guide 22.

The blanks 8 comprise three main cushioning panels designated in FIG. 2 by the numerals 23A, 23B and 23C. Panels 23A and 23B are interconnected by a fold line 25 while panels 23B and 23C are interconnected by a fold line 26. A fastening flap 27 is foldably joined to panel 23A along a fold line 28 while a similar fastening flap 29 is foldably joined to panel 23C along a fold line 30.

The blanks 8 are arranged in hopper 7 with panel 29 at the bottom and with panel 27 at the top, the projecting end portion 24 of panel 23B being at the rear as viewed in FIG. 1.

Thus, an auxiliary blank is first drawn through the guide 22 with the securing flap 29 along the leading edge of the blank and with the securing flap 27 along the trailing edge thereof, the edge 24 of the auxiliary blank being remote from the observer as viewed in FIG. 1.

As is shown in FIGS. 4 and 5, the feeder mechanism 9 is provided with suction cup 31 by which the lowermost one of the auxiliary blanks 8 is engaged and withdrawn from the hopper 7. Of course the auxiliary blank 8 is then passed downwardly through guide 22 by the feeder 9 as shown in FIG. 1 and is subsequently secured to the drum segment 32 by gripper element 33 as shown in FIG. 5. The leading edge or securing flap 29 slides underneath the gripper 33 and is by that means securely affixed to the drum segment 32.

As can best be seen in FIG. 10, gripper 33 is pivotally mounted at 34 on drum segment 32 and is biased radially inward by tension spring 35. Affixed to gripper 33 is a cam follower 36 which engages the fixed cam 37 due to rotation of drum 21 on its shaft 4. Thus, when cam follower 36 engages the beveled end portion 38 of cam 37, the gripper element 33 is moved radially outward so as to place the gripper in a proper position to receive the leading edge of auxiliary blank 8. During the dwell time when the cam follower 36 rides on the main central upraised portion 39 of cam 37, the gripper is held in the open position depicted in FIG. 10. When the cam follower 36 rides over the beveled end portion 40 of cam 37, the gripper is moved radially inward due to the action of spring 35 and the auxiliary blank is thus securely affixed to the drum segment 32 along the leading edge of the auxiliary blank.

Once the leading edge of the auxiliary blank 8 is secured to drum segment 32, it is then necessary to perform certain folding operations on the auxiliary blank 8. More specifically, the panel 23A is folded upwardly and over along the fold line 25 into face contacting relation with panel 23B.

In order to facilitate this folding operation, a pre-breaker is provided and as shown in FIGS. 4 and 5 may comprise a rotatable arm 41 mounted on rotating shaft 42 supported by bearing structure 43. Of course pre-breaker element 41 is caused to rotate in synchronism with the other elements of the machine and strikes the auxiliary blank at or near fold line 25.

The complete folding operation is performed by folding elements in accordance with a feature of this invention. As is best shown in FIG. 6, folding element 44 protrudes outwardly from segment 32. Folder 44 engages the trailing panel 23A and folds that panel upwardly along fold line 25. As is shown in FIG. 6, the auxiliary blank 8 is engaged by the pre-breaking element 41 and starts the folding operation along line 25. The motion of the folding element 44 is such that the element moves from its innermost position into an intermediate position depicted in FIG. 6 and thereafter the folder 44 swings outwardly and generally toward the right as viewed in FIG. 7 to occupy the position depicted in FIG. 7 whereby panel 23A is held in flat face contacting relation with panel 23B.

The above described operation of folder element 44 is shown schematically in FIGS. 6 and 7 and is obviously a composite motion. The particular folder structure and cam arrangement for effecting the aforementioned folding action is depicted in FIG. 11. With reference to FIG. 11, it is apparent that folder element 44 is pivoted at 45 to folder element 46 which in turn is pivoted at 47 to drum segment 32. Formed integrally with folder element 46 is a cam follower 48 which rides in a fixed cam groove 49 formed in fixed cam structure 50.

An additional component of the resultant motion of folder 44 is effected by cam follower 51 which is securely affixed to pivot 45 and hence movable with folder element 44. The cam follower 51 cooperates with the inner surface 52 of fixed cam guide 53. Thus, as the drum 21 and its associated drum segment 32 rotate about shaft 4, cam follower 48 rides in groove 49 and outward motion is imparted to the element 44 as folder element 46 swings about pivot 47 due to the configuration of cam groove 49 at part 54 thereof. As the follower 48 rides along portion 55 of groove 49, the element 46 is held in a fixed dwell position. During this period cam follower 51 engages the inner surface 52 of fixed cam guide 53 and motion of folder element 44 about pivot 45 is thereby imparted which is in a clockwise direction as viewed in FIG. 11. In this manner the position of folder 44 as depicted in FIG. 7 is achieved. Once the folding operation is completed and after the need for holding the panel 23A in its folded position has expired, the cam follower 48 rides radially inward along the portion 56 of cam groove 49 to release the holding operation of folder 44 at the trailing edge of the auxiliary blank. Since the projecting portion 24 of the auxiliary blank 8 is the part to which glue must be affixed and since adhesive is applied from a suitable stationary device such as is designated at 57 in the drawings, the folder element 44 is caused to ride over the portion 55 of cam 48 as the blank passes the adhesive applicator 57 and the main blank B1.

Thus, as is shown in FIG. 8 the folder element 44 holds the trailing edge of the auxiliary blank 8 while the adhesive applying plunger 58 mounted on segment 32 immediately below the trailing edge of blank 8 moves radially outward so as to force the projecting portion 24 of auxiliary blank 8 into engagement with adhesive wheel 57A and thereby to cause adhesive from applicator 57 to adhere to the exposed surface of projecting portion 24 of the auxiliary blank. The position of the parts as depicted in FIG. 8 is such that an application of adhesive is then being made. In FIG. 9 the auxiliary blank 8 is shown being firmly affixed to the upper surface of blank B1 which preferably is supported at that point by yieldably mounted roller means 63.

The structure for imparting operating motion to the adhesive applying plunger 58 is shown in FIG. 12 and comprises pivot 59 together with biasing spring 60 which tends to impart counter-clockwise rotation to plunger 58 as viewed in FIG. 12. Clockwise rotation about pivot 59 is imparted to plunger 58 by fixed cam 61 which engages the surface 62 of plunger 58 to impart clockwise rotation thereto about pivot 59 at the desired moment so as to force the projecting edge 24 of auxiliary blank 8 into contact with the applicator wheel 57A. In this manner glue is applied to the exposed surface of the blank 8.

Once adhesive is applied to the blank 8, i.e. to the desired area 24 of the exposed surface of panel 23B, plunger 58 withdraws and the desired part 24 of blank 8 is pressed into firm contact with the desired part of main blank B1 due in part to the action of compression spring 64 which urges roller 63 upwardly. Of course, once the auxiliary blank 8 is secured along its projecting edge 24 to blank B1, the result sought by this invention is completed and the parts are then in condition to repeat the above described operation.

While a single segment 32 has been shown and described, it will be understood that several such segments may be mounted about the periphery of the drum 21. In fact one suitable arrangement utilizes three segments and another practical embodiment utilizes four segments such as 32.

Of course, a similar structure to that shown in FIG. 1 may be mounted immediately alongside and adjacent to the structure shown in FIG. 1 so that two auxiliary blanks such as 8 may be simultaneously affixed to a main blank such as B1 and such for example as is shown and described in the aforementioned Patent 3,203,324.

While a particular embodiment of this invention has been shown and described, it will be understood that the invention is not limited thereto and it is intended in the appended claims to cover all such changes and modifications as fall within the true spirit and scope of the invention.

The embodiments of the invention in which an exclusive property or privilege is claimed are defined as follows:

1. A machine for withdrawing a multi-panelled auxiliary blank from a hopper and for folding and affixing said auxiliary blank to a main blank during movement of said main blank along a predetermined path, said machine comprising a rotatable drum, feeder means for withdrawing said auxiliary blank from the hopper and for moving it toward said drum, gripper means on said rum for engaging a portion of said auxiliary blank and for holding it in fixed position on said drum, folder means on said drum for engaging a part of said auxiliary blank and for folding said part outwardly and over into generally flat face contacting relation with the adjacent part of said auxiliary blank and for holding said auxiliary blank in folded condition, means for applying adhesive to a part of said auxiliary blank and for forcing it into firm contact with the main blank, and means for releasing said gripper means and said folder means.

2. A machine according to claim 1 wherein the axis of rotation of said drum is generally normal to and spaced from the path of movement of the main blank.

3. A machine according to claim 1 wherein the axis of rotation of said drum is generally parallel with and spaced from the plane of the main blank as the blank is moved along its predetermined path.

4. A machine according to claim 1 wherein said gripper means and said folder means are movably mounted on said drum and wherein fixed cam means are disposed for engagement therewith for imparting operating movement thereto in coordination with rotation of said drum.

5. A machine according to claim 1 wherein pre-breaking means is disposed adjacent said drum and positioned to engage said auxiliary blank and to initiate folding thereof prior to engagement thereof by said folder means.

6. A machine according to claim 1 wherein the portion of said auxiliary blank which is engaged by said gripper means is disposed along the leading edge thereof.

7. A machine according to claim 1 wherein the part of said auxiliary blank which is engaged by said folder means is disposed along the trailing edge thereof.

8. A machine according to claim 1 wherein the part of said auxiliary blank which is folded into face contacting relation with the adjacent part thereof comprises one panel along the trailing edge of the auxiliary blank.

9. A method for securing a multi-panelled auxiliary blank to a main blank during movement of said main blank along a predetermined path, said method comprising the steps of moving said auxiliary blank at substantially the same speed as the speed of movement of said main blank along a path above and coincidental with the path of movement of the main blank, the panels of said auxiliary blank being initially disposed one behind another along the path of movement of said auxiliary blank, folding panel of said auxiliary blank into flat face contacting relation with an adjacent part of said auxiliary blank, forcing at least a part of said auxiliary blank into contact with a source of adhesive material and thereafter into firm contact with the main blank.

References Cited

UNITED STATES PATENTS 2,990,081   6/1961   Nevi et al. _____ 156—519

BERNARD STICKNEY, *Primary Examiner.*